Jan. 12, 1960 W. J. LOWERY 2,920,534
DUD JETTISONING DEVICE
Filed March 14, 1958 6 Sheets-Sheet 1

INVENTOR
WILLIAM J. LOWERY
BY
ATTORNEYS

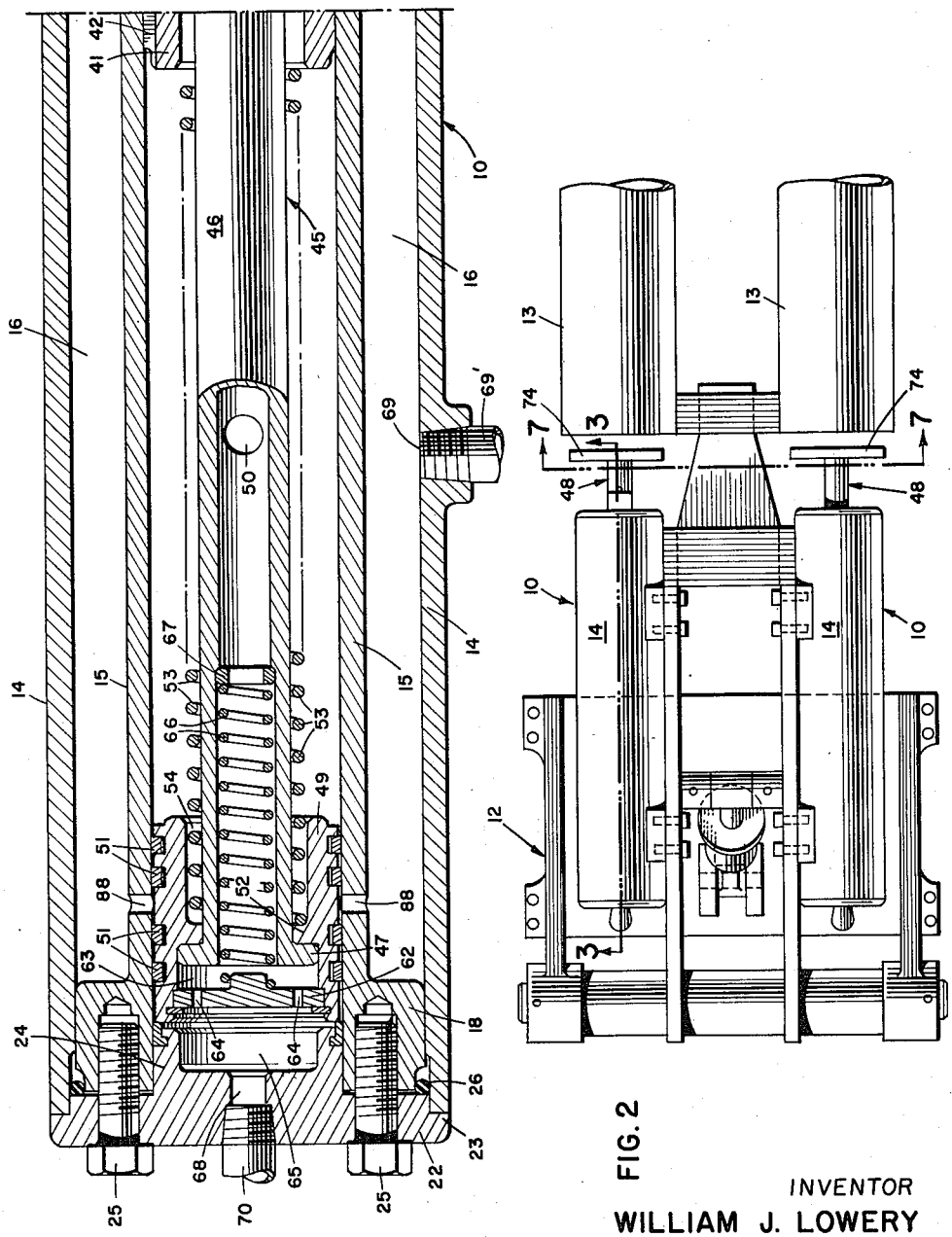

Jan. 12, 1960     W. J. LOWERY     2,920,534
DUD JETTISONING DEVICE
Filed March 14, 1958     6 Sheets-Sheet 3
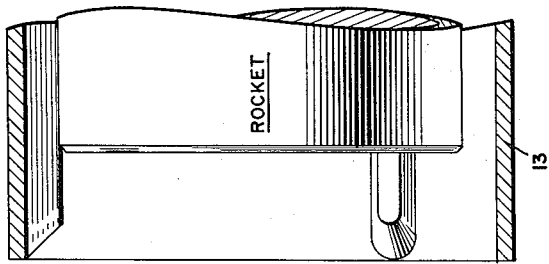
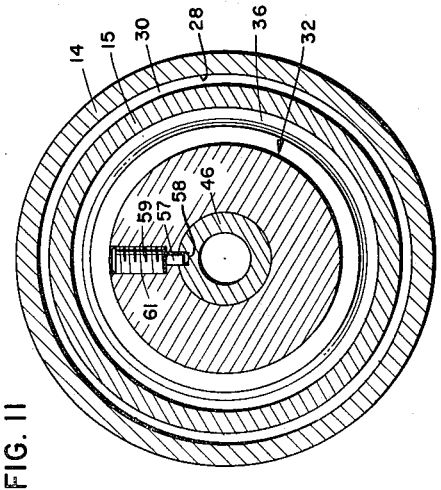
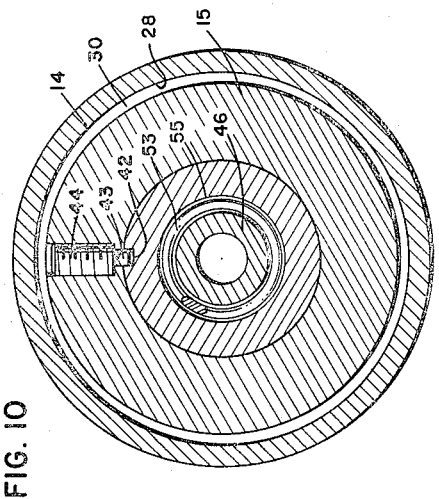
INVENTOR
WILLIAM J. LOWERY
BY
ATTORNEYS

INVENTOR
WILLIAM J. LOWERY
BY
ATTORNEYS

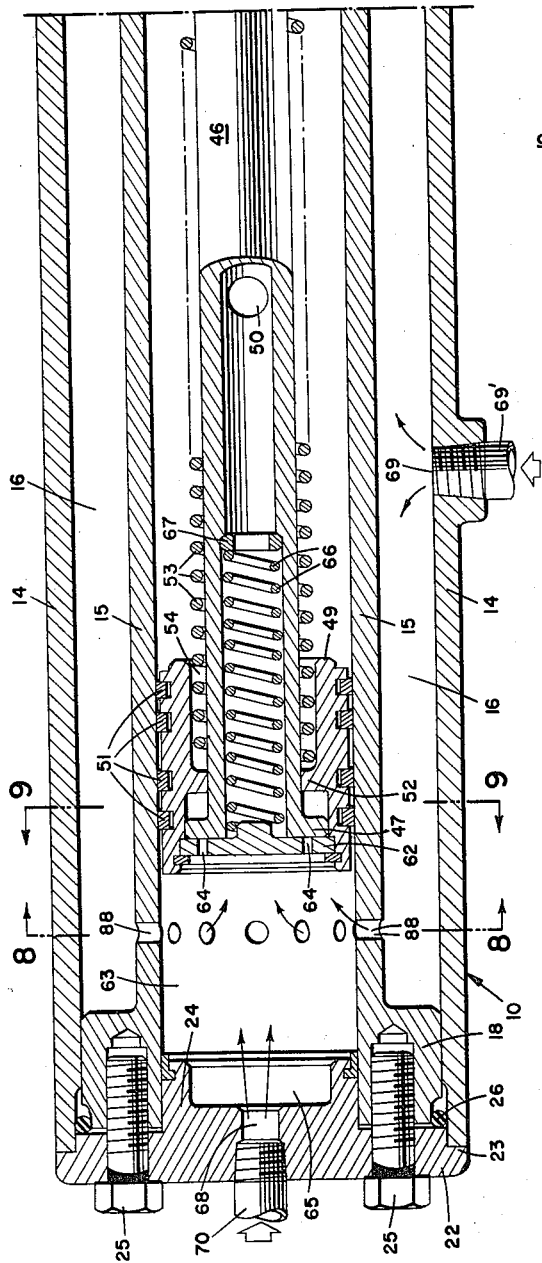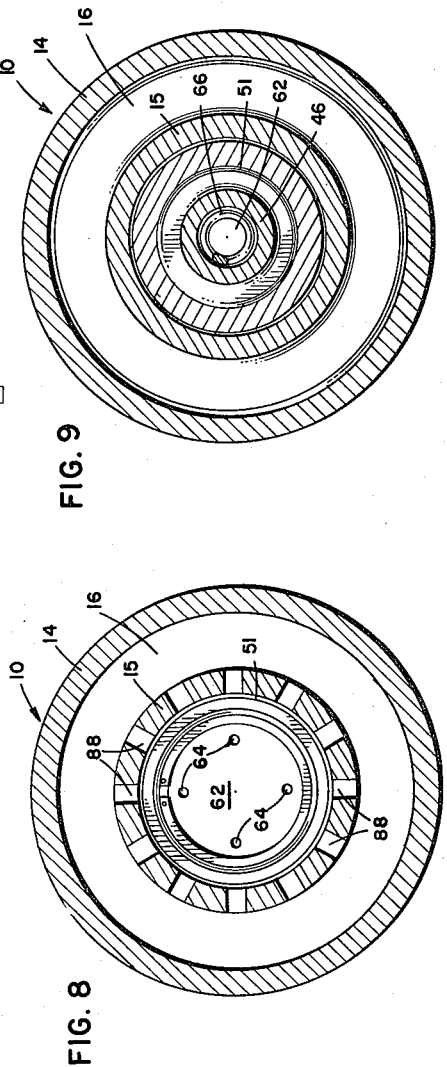

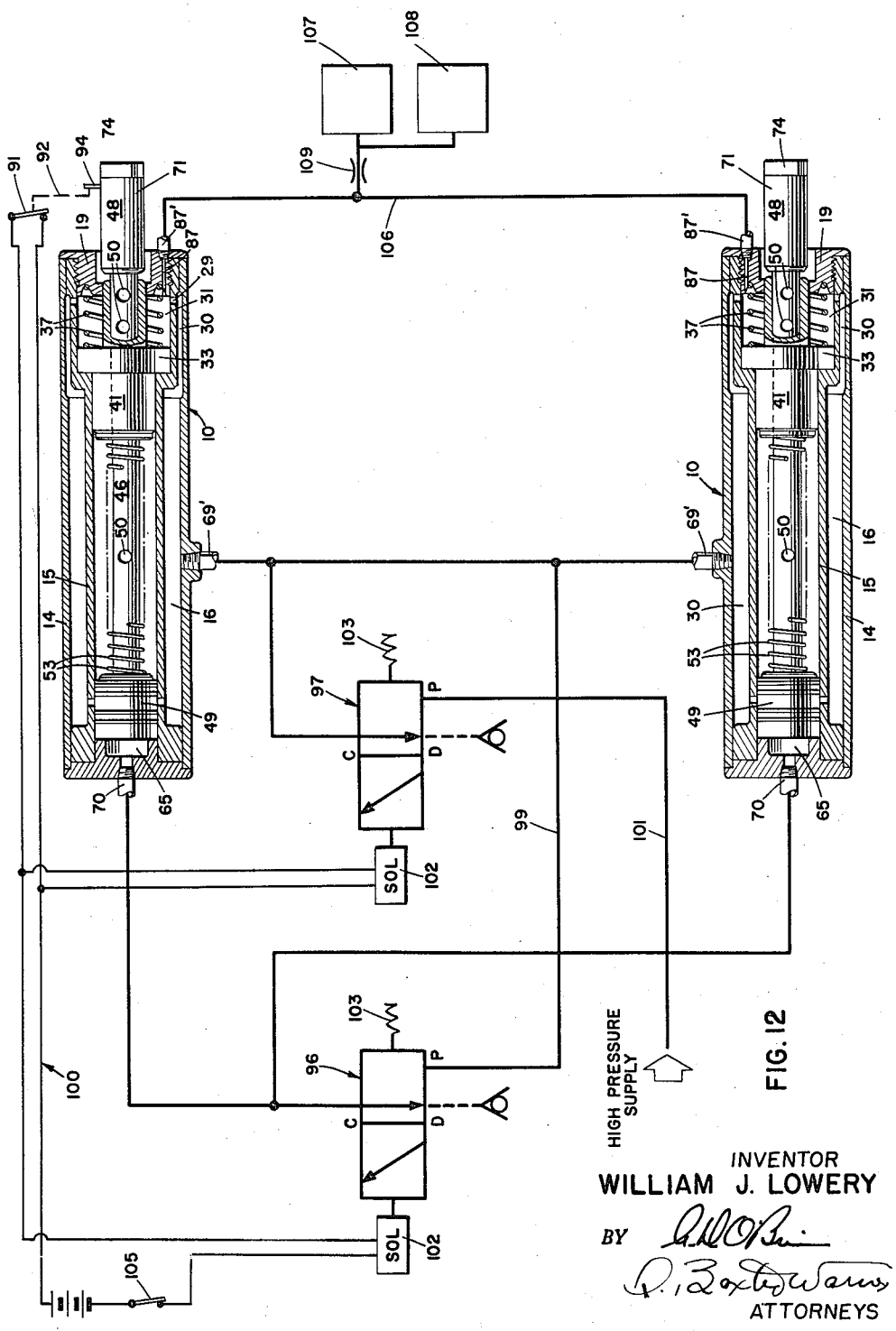

2,920,534

DUD JETTISONING DEVICE

William J. Lowery, Washington, D.C., assignor to the United States of America as represented by the Secretary of the Navy Application March 14, 1958, Serial No. 721,620

6 Claims. (Cl. 89—1.7)

(Granted under Title 35, U.S. Code (1952), sec. 266)

The invention described herein may be manufactured and used by or for the Government of the United States of America for governmental purposes without the payment of any royalties thereon or therefor.

The present invention relates to a jettisoning device and more particularly to a dud ejecting mechanism suitable for use with an automatic rocket launcher of the type comprising one or more rocket guide or launching tubes which oscillate between an inclined firing position and a vertical loading position whereupon in the loading position the aforesaid tubes are in alignment with hoist means which deliver ammunition to the tubes.

Heretofore, during the operation of a rocket launcher of the type to which the present invention pertains, misfires occasionally occur due to improper functioning of the conventional igniter or perhaps due to failure of the propellant being instantaneously ignited by the igniter, resulting in a rocket remaining in one of the rocket guide or launching tubes after the firing switch is actuated to a closed position to supply a firing impulse to the igniter. When this occurs the operator must stop the launcher and thereafter wait and see if the rocket is expelled from the tube under its own power, since occasionally this may happen, particularly if the propellant is not initiated instantaneously upon closing of the firing switch. Should the rocket fail to be expelled from the tube under its own power, it is necessary to obtain volunteers to manually remove or eject the rocket from the tube. Moreover, in some instances before removal operations and to provide safety precautions to prevent injury to the removal crew, it is necessary to flush water through the tube for a considerable amount of time before the rocket may be removed therefrom. Although certain essential safety precautions have been heretofore set forth it will be understood that occasionally numerous other safety precautions must be observed during the removal of a rocket from the launching tube in the event of a misfire.

In view of the foregoing, the disadvantages of previous methods and equipment of various types used in removing dud rockets from launching tubes are manifest. A prime disadvantage lies in the time consumed when the launcher is out of service during the presence of a dud in one of the launching tubes, and further disadvantages reside in the time consumed in the manual removal of the dud from the tube by the crew members and the possibility of injury to the crew members should ignition of the rocket propellant occur during removal operations.

In accordance with the present invention the aforesaid disadvantages have been overcome by providing a remote controlled automatic dud jettisoning device to be mounted on and trained with the launcher mount whereupon a dud missile may be quickly ejected from the launcher tube without the necessity of crew members exposing themselves to possible injury. Moreover, the invention provides a new and improved dud jettisoning device wherein a dud is automatically ejected from a launcher tube and into a body of water as a safety precaution.

Accordingly, an object of the present invention is to provide a new and improved dud jettisoning mechanism for a missile launching device.

Another object of the invention resides in the provision of a device for quickly ejecting a dud from an automatic rocket launcher.

A further object of the invention is to provide a dud ejecting device for a rocket launcher of the type comprising a pair of rocket guide tubes which oscillate between firing position and a vertical loading position.

A further object of the invention is the provision of an ejecting device for quickly and safely ejecting a dud from a rocket tube.

A still further object of the invention is to provide a remote controlled ejecting mechanism for quickly ejecting a dud from a rocket launching tube without the necessity of the crew members entering the danger zone in the event that the rocket fails to be expelled from the tube.

Other objects and many of the attendant advantages of this invention will be readily appreciated as the same becomes better understood by reference to the following detailed description when considered in connection with the accompanying drawings wherein:

Fig. 2 is an enlarged fragmentary plan view of the arrangement of Fig. 1;

Figure 7:
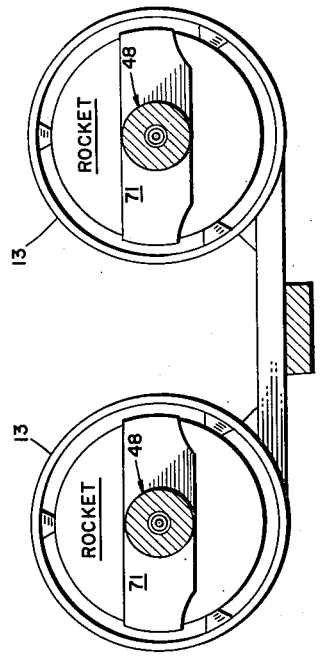
Figure 4A:
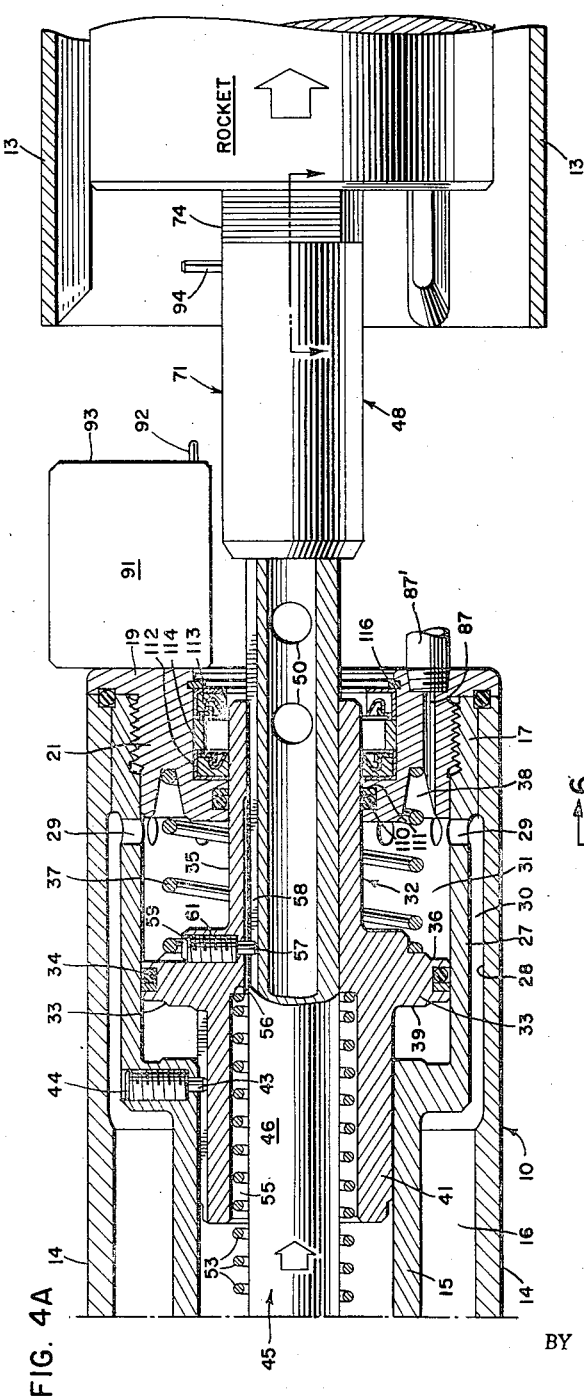
Figure 6:
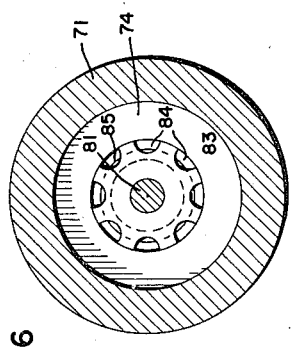
Figure 5:
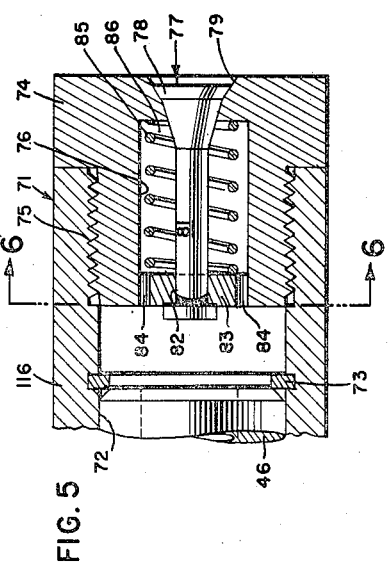

Figs. 3 and 3A, when placed end-to-end, form an enlarged longitudinal sectional view taken substantially on line 3—3 of Fig. 2;

Figs. 4 and 4A, when placed end-to-end, form a changed position view similar to Figs. 3 and 3A but with the pusher member in engagement with a dud rocket to eject the rocket from the launching tube;

Fig. 5 is an enlarged fragmentary section view of the pusher member as viewed from a line substantially corresponding to line 5—5 in Fig. 4A;

Fig. 6 is a sectional view taken along a line substantially corresponding to line 6—6 of Fig. 5;

Fig. 7 is an enlarged section view taken along a line substantially corresponding to line 7—7 of Fig. 2;

Fig. 8 is a cross-sectional view taken along a line substantially corresponding to line 8—8 of Fig. 4;

Fig. 9 is a cross-sectional view taken along a line substantially corresponding to line 9—9 of Fig. 4;

Fig. 10 is a cross-sectional view taken along a line substantially corresponding to line 10—10 of Fig. 3A;

Fig. 11 is a cross-sectional view taken along a line substantially corresponding to line 11—11 of Fig. 3A; and Fig. 12 is a diagrammatic view of a hydraulic system suitable for use with the jettisoning device of the present invention.

Figure 1:
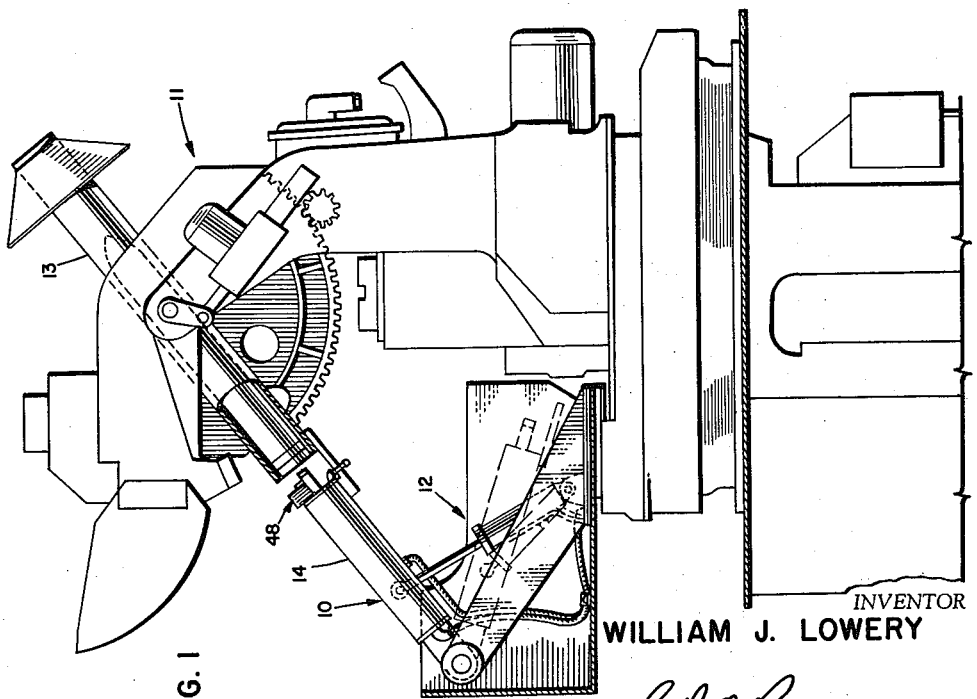
Fig. 1 is a view in side elevation of a launcher and the jettisoning device of the present invention with the rocket guide tube of the launcher and the jettisoning device in a jettisoning position.

Referring now to the drawings and more particularly to Fig. 1, the jettisoning device of the present invention is generally indicated by the reference character 10 and mounted on a conventional rocket launcher 11 for movement from a stowed position to a dud ejecting position by a linkage structure 12, similar to the linkage structure disclosed and claimed in the copending application of Marvin H. Meekins et al., Serial No. 413,486, filed March 1, 1954, now U.S. Patent No. 2,831,399, for Dud Jettisoning Device for Rocket Launcher. It will be understood that the aforesaid launcher is provided with a pair of rocket guide tubes 13, Fig. 2 and operates through the usual loading, firing and jettisoning cycles as clearly set forth in the aforesaid copending application and since the present invention is particularly concerned with the jettisoning position, Fig. 1, it is deemed unnecessary to set forth the complete operational cycles of the launcher.

It will be noted in Fig. 2 that the aforesaid linkage structure 12 carries a pair of jettisoning devices 10 which are adapted to be moved into alignment with the tubes 13 when the launcher is in a jettisoning position and adapted to be actuated to cause a dud rocket to be ejected from both of the tubes or from either one or the other of the tubes as the situation may require.

The jettisoning devices 10 are identical in structure and operation. As clearly shown on Figs. 3, 3A, 4 and 4A, each device includes an outer elongated cylinder 14 and an inner cylinder 15 in spaced relation with respect to the outer cylinder 14 to provide an annular high pressure reservoir or chamber 16 therebetween. The inner cylinder 15 is provided with a head 17 at one end and a head 18 at the other end thereof. These heads are in engagement with the bore of cylinder 14 thereby forming a closure at each end thereof to provide the aforesaid chamber 16. A plug 19, Figs. 3A and 4A, is disposed at one end of inner and outer cylinders 14 and 15 and has a central stem 21 formed thereon. Plug 19 is secured to the head 17 in any suitable manner, such for example as by threaded connection therewith. A similar plug 22, Figs. 3 and 4, is disposed at the other end of inner and outer cylinders 14 and 15. Plug 22 has a flange 23 and an annular portion 24 formed thereon, the flange being in engagement with the other end of the cylinder 15 and the annular portion 24 being in engagement with the inner surface of cylinder 15. As is best shown on Figs. 3 and 4, plug 22 may be secured to head 18 by a plurality of screws or the like 25. It will be noted that clearance is provided between one end of head 18 and one end of plug 22 and a sealing gasket 26 is disposed therebetween in engagement with cylinder 14 and thus providing and maintaining a positive sealing connection between outer cylinder 14 and inner cylinder 15 as screws 25 are threaded into the head 18 an amount sufficient to compress the gasket 26. The head 17 is provided with a reduced portion 27 the diameter of which is lesser than the diameter of the head 17 and which is in spaced relation with respect to an annular enlargement 28 formed in cylinder 14 thereby to provide an annular chamber 30 between outer cylinder 14 and reduced portion 27 and at one end of the reservoir 16. It will be noted, Figs. 3A and 4A, that ports 29 in member 27 provide communication between chamber 30 near one end thereof and a buffer chamber or space 31.

A buffer generally indicated by the reference character 32 is disposed within the chamber 31, Figs. 3A and 4A, and comprises a piston 33 in sealing engagement with member 27 by means of a gasket 34 thereby to provide a positive seal between the piston 33 and member 27 within which the piston is adapted to move. A sleeve or tubular shank 35 is integrally formed with the piston 33 and extends toward the aforesaid plug 19, shank 35 being provided at one end thereof with an annular seat 36 which receives one end of a buffer spring 37, the other end thereof being seated in a recess 38 formed in the plug 19. The spring 37 normally maintains the piston 33 seated against shoulder 39 formed on the inner cylinder 15 and within the buffer chamber 31. Integrally formed with piston 33 is a second sleeve or tubular member 41 disposed within the bore of inner cylinder 15 and extending therein a predetermined amount. The sleeve 41 is provided with a longitudinally disposed groove 42 for receiving a pin 43 provided on the inner end of a screw 44 threaded into the member 27 to prevent rotation of the buffer during longitudinal movement thereof between the buffer and return strokes.

A dud ejecting member or pusher generally indicated by the numeral 45, Figs. 3, 3A and 4, 4A, is disposed within and is movable longitudinally through the inner cylinder 15 and comprises an elongated tubular member 46 having a flange 47 formed on one end thereof and a pusher member or foot generally indicated by the numeral 48 formed on or carried on the other end thereof, the member 46 being provided with a plurality of ports 50, the purpose of which will be more clearly apparent as the description proceeds. A piston 49 is slidably disposed on member 46 in sealing engagement with inner cylinder 15 by means of sealing rings 51 and having an internal flange or stop 52 formed thereon and normally in engagement with flange 47 on member 46. The stop 52 is maintained in abutting engagement with flange 47 by a spring 53 having one end disposed within a recess 54 formed in piston 49 in engagement with flange 52, the other end thereof being disposed within a recess 55 formed in sleeve 41 in engagement with the bottom wall 56 defining the recess 55. The spring 53 is adapted to return the piston 49 to its initial position after a dud jettisoning operation. In addition, spring 53 allows longitudinal movement of the ejecting assembly 45 during a dud jettisoning operation and, to prevent rotation thereof, a pin 57 is received within a longitudinal groove 58 formed in member 46. Pin 57 is carried by a screw 59 threaded into sleeve 35 as at 61.

Referring now to Figs. 3 and 4, a closure or vent disc 62 is secured within a recess 63 formed in piston 49 and in which the aforesaid flange 47 is arranged, the disc being provided with a plurality of apertures 64 for establishing communication between recess 63 and chamber 65 formed in plug 22. A spring 66 is disposed within the tubular member 46 of assembly 45 with one end in engagement with disc 62, the other end thereof being in engagement with an annular member 67 arranged within the member 46.

The chamber 65, Figs. 3 and 4, is in communication with a port 68 formed in plug 22, the port being adapted to admit an initial or triggering pressure into chamber 65 and thence by way of pipe 70 into recess 63 by way of ports or apertures 64 thereby to initially actuate the piston 49 during a dud ejecting operation. The outer cylinder 14 is provided with a port 69 in communication with the high pressure reservoir 16 arranged in cylinder 14 in a manner such that air under pressure enters the reservoir substantially at the center thereof by way of pipe 69'.

The aforesaid pusher member 48 comprises a casing 71 having a centrally disposed bore 72 therein for receiving the terminal reduced end of the tubular element 46 which abuts an annular internal flange 73 carried by the casing 71 and which may be secured to the casing 71 in any conventional manner. A pusher foot 74 in the form of a flat bar is secured to the casing 71 in any suitable manner, preferably as being threaded into bore 72 as at 75, the bore 72 aligning with the bore in tubular member 46 and with a bore 76 formed in foot 74. A low pressure check valve generally indicated by the reference character 77 is arranged within bore 76 and comprises a head 78 normally in engagement with a seat 79 formed in member 74, the head having integrally formed therewith a stem 81 extending centrally through bore 82 formed in disc 83 provided with a plurality of ports 84, the stem being secured to the disc in any suitable manner. A spring 85 is disposed about stem 81 and having one end in engagement with disc 83 and the other end thereof in engagement with a shoulder 86 formed on member 74 and within bore 76 whereupon the head 78 is maintained in engagement with seat 79.

As more clearly shown on Figs. 3A and 4A the head 19 is provided with a port 87 in communication with the aforesaid buffer chamber 31 and having a pipe 87' threaded therein, the inner cylinder or tubular member 15 being provided with a plurality of ports 88 in communication with reservoir 16 and the bore of cylinder 15, the ports 88 being normally sealed by piston 49 and adapted to unseal the ports when the piston is moved a predetermined amount as low pressure is applied thereto by way of trigger port 68. When this occurs high pressure is admitted into cylinder 15 by way of ports 88 and applied against piston 49 whereupon the piston and member 46 are quickly and forcibly moved an amount sufficient to cause foot 74 to engage and eject a dud rocket from the launching tube. Moreover, the aforesaid ports 29 in portion 27 of head 17 provide, near the forward end of the latter, communication between the buffer chamber 31 and the aforesaid chamber 30 of reservoir 16 whereupon buffer action will occur by reason of the high pressure contained within buffer chamber 31 and the aforesaid structure of the buffer 32 when the piston 49 moves an amount sufficiently to engage the tubular extension 41 carried by the buffer 32 during a dud ejection operation. It will be further understood that piston 49 has limited movement with respect to tubular member 46, this movement being an initial movement and caused by pressure entering trigger port 68. The extent of initial movement of piston 49 is controlled by the distance between the enlargement or flange 47 on tubular member 46 and the closure or disc element 62. The aforesaid opening or ports 64 in the disc 62 are provided to allow an equalization of the pressure on both sides of the piston or head 49. The aforesaid ports in addition to causing equalization of the pressure provide means for venting high pressure air by way of tubular member 46 and valve 77 in the event that the air passes beyond the aforesaid rings 51 in piston 49 in a direction toward the disc 62. Furthermore, since the air in reservoir 16 is under high pressure there is a possibility that air may leak past rings 51 and thus if not vented the pressure would build up behind the piston sufficiently to actuate the piston thereby causing premature operation of the ejecting means and ejection of the rocket from the tube. The ports 64 further speed up the return of piston 49 from an ejection position to an initial position by allowing air entrapped behind the piston to escape therethrough and into tubular member 46 whereupon a certain amount of pressure passes through the check valve 77. It will be understood, however, that during an ejection operation and when the ports 50 are disposed beyond the end of plug 19 a large amount of pressure will be exhausted into the atmosphere by way of ports 50 in member 46. Moreover, it will be further understood that the piston 49 and tubular member 46 may be operated at no load, such for example, as when no dud is to be ejected, without undue acceleration, since piston valve or disc 62 will not completely close against piston 49 whereupon sufficient space is provided between disc 62 and flange 47 to provide a bleed-off passage by way of tubular rod 46 and ports 50 thereby to slow down the piston and rod assembly.

As is shown on Figs. 3A, 4A and 12, a switch 91 is carried by and secured to the gland or plug 19 in any suitable manner. The switch is provided with a conventional actuating element 92 extending beyond the switch casing 93 and having a lug 94 carried by the casing 71 and normally in engagement with actuating element 92. By the aforesaid arrangement the switch is maintained in a normally closed position and will be actuated to an open position as lug 94 moves out of engagement with element 92 in response to movement of the device to a dud ejecting position.

During a dud ejecting operation, a charging pressure is admitted in reservoir 30 by way of port 69 and thereafter trigger pressure is admitted into chamber 65 by way of port 68. As the trigger pressure enters chamber 65 and impinges against disc 62 and piston 49, the aforesaid elements will be moved along tubular member 46 and with respect thereto until disc 62 contacts flange 47 on member 46. During the aforesaid operation it will be understood that the charging pressure has been building up in reservoir 16 and is relatively high with respect to the trigger pressure in chamber 65. The spaced relationship between disc 62 on piston 49 and flange 47 on rod 46 is such that the pusher foot will engage the rocket prior to movement of the piston an amount sufficiently to uncover ports 88 in member 15. As soon as the pusher foot contacts the rocket and the ports 88 are subsequently uncovered by further movement of the piston 49, combined trigger and charging pressure from chamber 65 and reservoir 30 maintain the disc or valve 62 in engagement with flange 47 on member 46 and thus sealing ports 64 in disc 62. When this occurs, and in response to the combined trigger and charging pressures being applied against disc 62 and piston 49, the aforesaid elements including pusher 48 and pusher foot 74 are moved an amount and with sufficient force by the combined pressures to forcibly eject a dud rocket from the rocket tube. During an ejection operation, such for example, as when piston 49, member 46 and pusher 48 are moving in a direction toward the rocket, valve or disc 62 carried by piston 49 is in engagement with the flange 47 on member 46 and enlargement or stop 52 on member 49 is in spaced relation with respect to flange 47 thereby to provide for subsequent movement of member 46. For example, when piston 49 has moved into engagement with buffer 32 the inertia of member 46 continues to carry it forward until flange 47 strikes stop 52 and thus the buffing action of the piston 49 is broken up into lesser blows. Furthermore, when the rocket has been ejected and the device has been vented, spring 53 returns piston 49 to an initial position, spring 37 returns the buffer 33 to an initial position and spring 66 maintains stop 52 in engagement with flange 47 on tubular rod 46 and thus the device is conditioned for another cycle of operation.

In Fig. 12 a suitable control system is illustrated in connection with the pair of dud ejecting devices. The system comprises a pair of electrically actuated control valves 96—97, valve 96 being constructed and arranged to supply chamber 65 with a trigger pressure to operate piston 49 and valve 97 being constructed and arranged to supply reservoir 30 with a charging pressure, the valves being also operable to cause venting of the system and jettisoning devices whereupon the devices may be actuated to an initial position after a dud ejecting operation. It will be noted, Fig. 7, that pipe 69' is provided with a branch pipe 99 connected to valve 96 whereupon pressure entering valve 97 will also enter valve 96 provided that both valves are in a pressure receiving condition for receiving the pressure from a suitable source of fluid pressure (not shown). The initial pressure is supplied to valve 97 by way of pipe 101 connected thereto and to the aforesaid source of fluid pressure. It will be understood, however, that the pressure from the source may be controlled by a conventional air supply valve and safety valve whereupon the initial pressure may be supplied to valve 97. Valves 96—97 are conventional two-way valves constructed and arranged to be operated to admit fluid pressure into cylinder 15 to actuate the jettisoning means to a jettisoning position, as heretofore set forth, and to bleed-off any of the fluid pressure remaining in the system and devices after the jettisoning means have been actuated to the jettisoning position. Valves 96 and 97 are provided with a solenoid 102 and a spring 103, the solenoids and switch 91 being included in an electrical control circuit 100. Thus, when switch 91 is maintained in a closed position by lug 94 in engagement with the switch actuating element 92, the solenoids are energized and move the valves to a position to allow fluid pressure to enter chambers 65 and reservoirs 30 whereupon the devices are actuated to a jettisoning position in response to the initial pressure applied to piston 49 and the additional pressure subsequently applied thereto from reservoirs 30. The aforesaid circuit includes a source of electrical energy and control switch 105.

Upon movement of the pusher 48 during a jettisoning operation, the lug moves away from switch actuating element 92, the switch is actuated to an open position whereupon the circuit to the solenoids 96—97 is broken. When this occurs the solenoids are de-energized and springs 103 move valves 96 and 97 to a position to allow any fluid pressure remaining in the system to be vented therethrough and into the atmosphere and thus the aforesaid jettisoning assembly and buffer means are instantaneously moved to an initial position by these respective return springs 52 and 37. A pipe 106 connects the two jettisoning devices at the forward or jettisoning end thereof, the pipe being disposed within the port 87 arranged in each of the glands 19 to provide communication between the aforesaid buffer chambers 31 arranged within and at the forward end of each jettisoning device. Suitable signaling devices 107 and 108 such, for example, as conventional pressure responsive devices are carried by and in communication with pipe 106. Signaling device 107 is constructed and arranged to be actuated when the pressure in chambers 31 reaches a predetermined pressure as, for example, 575 p.s.i. and signaling device 108 being constructed and arranged to be actuated when the pressure in the chambers drop to a lower predetermined pressure as, for example, 5 p.s.i., thereby to give a visual indication to the operator when the fluid pressure charge within the jettisoning device has reached predetermined value or when the charge has dropped below the predetermined value. It will be noted, Fig. 7, that a conventional snubber 109 is employed in pipe 106 to prevent a severe or sudden shock from being transmitted to the aforesaid signaling devices.

As more clearly shown on Figs. 3 and 4, a sealing gasket or ring 110 is disposed within a groove 111 formed in the gland 19 in sealing engagement with the tubular member 35 carried by piston 33. Additional sealing rings or gaskets 112 and 113 are arranged in a well 114 formed in gland 19, ring 112 is in sealing engagement with member 35 on piston 33 and with the gland 19 and ring 113 being in sealing engagement with the casing 71 of pusher 48. The aforesaid sealing rings 112 and 113 are maintained within the well 114 in any suitable manner, such for example, as by a conventional split retaining element 116. Thus by the aforesaid sealing arrangement the fluid pressure is maintained within chamber 31 and leakage therefrom is prevented.

From the foregoing, it will be apparent that a new and improved dud ejecting mechanism has been devised which is remotely controlled and is provided with means responsive to fluid pressure and thereby functions to quickly eject a dud from a rocket launching tube in the event that the rocket fails to be expelled from the tube under its own power.

Obviously many modifications and variations of the present invention are possible in the light of the above teachings. It is therefore to be understood that within the scope of the appended claims the invention may be practiced otherwise than as specifically described.

What is claimed is:

1. A device for ejecting dud rockets from a guide tube of a launching tube, comprising an inner cylindrical member and an outer cylindrical member in mutually spaced relation with respect to each other and providing a chamber therebetween and containing a quantity of high pressure fluid therein, an elongated tubular member sealed within said inner cylindrical member and movable therein, a piston slidably disposed within said inner cylindrical member and movable therealong a predetermined distance in response to a triggering pressure admitted into the inner member, means in communication with said inner member for admitting the triggering pressure therein, means on said piston and movable thereby, complementary means on said tubular member engaged by said movable means for providing a rigid coupling therebetween such that the piston and tubular member are movable as a unit, port means in said inner member in communication with said chamber and normally sealed by said piston for admitting said high pressure into said inner cylindrical member when said piston has been moved a distance sufficiently to unseal said port means whereupon the combined high fluid pressure and triggering pressure within the inner cylindrical member forcibly and quickly moves the tubular member to a dud rocket ejecting position, and means on said tubular member and movable thereby for ejecting a dud rocket from a launching tube as the tubular member is moved to said dud rocket ejecting position.

2. A device according to claim 1 wherein means including vent means in said tubular member gradually releases fluid compressed in the inner cylindrical member in response to movement of said piston therein and when the piston moves said tubular member a predetermined distance beyond the ends of the cylindrical members during a dud ejection operation.

3. A device according to claim 1 wherein buffer means disposed in said inner cylindrical member and normally in spaced relationship with said piston absorbs the force of the shock as said piston is forcibly driven into engagement with said buffer means by said combined pressure during a dud ejecting operation.

4. A device for ejecting a dud rocket from a guide tube of a rocket launcher, comprising an inner member and an outer member and a chamber therebetween containing a quantity of high pressure fluid, a tubular member sealed within said inner member and movable therein, means slidably disposed within said inner member and movable a predetermined distance along said tubular member and with respect thereto, pressure admitting means in communication with the inner member for admitting a triggering pressure therein, disc means on said slidable means and responsive to said triggering pressure for moving said slidable means said predetermined distance, means on the tubular member engaged by said disc means for moving said slidable means and the tubular member as a unit when said slidable means has been moved said predetermined distance, port means in communication with said high pressure chamber for admitting said high pressure fluid into the inner member when said slidable means has been moved a distance in excess of said predetermined distance and unseals said port means, whereupon the combined high fluid pressure and triggering pressure forcibly moves the tubular member to a dud rocket ejecting position, means controlled by said tubular member for ejecting a dud rocket from said guide tube as the tubular member moves to the dud rocket ejecting position, and means for returning said tubular member and the slidable means to an initial position as said dud rocket ejecting cycle is completed, said last-named means maintaining the tubular member and the slidable means in said initial position until said triggering pressure is admitted into the inner member.

5. A device according to claim 4, including vent means in said disc means, complementary means in said tubular member and the ejecting means for venting pressure in the event that the pressure leaks past said slidable means thereby to prevent a build-up of pressure behind said slidable means and premature operation of the slidable means.

6. A device according to claim 4, including a yieldable element in engagement with said disc means for enabling the slidable means to be moved said predetermined distance with respect to said tubular member in response to impingement of the pressure against the disc means, thereby to provide a rigid coupling between the slidable means and the tubular member to cause movement of the ejecting means into engagement with the dud rocket before the slidable means has been moved an amount to unseal said ports means.

References Cited in the file of this patent
UNITED STATES PATENTS

| | | |
|---|---|---|
| 1,191,174 | Gilligan | July 18, 1916 |
| 1,841,969 | Methlin | Jan. 12, 1932 |
| 1,845,218 | Barnes | Feb. 16, 1932 |
| 2,466,980 | Bronson | Apr. 12, 1949 |
| 2,788,769 | Ketchum | Apr. 16, 1957 |
| 2,831,399 | Meekins et al. | Apr. 22, 1958 |

FOREIGN PATENTS

| | | |
|---|---|---|
| 1,000,245 | Germany | Jan. 3, 1957 |